United States Patent [19]
Robieux

[11] Patent Number: 4,710,914
[45] Date of Patent: Dec. 1, 1987

[54] OPTICAL FIBER TELECOMMUNICATION DEVICE

[75] Inventor: Jean Robieux, Chatenay Malabry, France

[73] Assignee: Compagnie General d'Electricite, Paris, France

[21] Appl. No.: 899,352

[22] Filed: Aug. 22, 1986

[30] Foreign Application Priority Data

Aug. 29, 1985 [FR] France ................. 85 12902

[51] Int. Cl.⁴ .................. H04B 9/00; H04J 1/02
[52] U.S. Cl. ..................... 370/3; 455/607; 455/612
[58] Field of Search .......... 370/1, 3, 57; 455/606, 455/607, 612, 610; 350/96.16

[56] References Cited

U.S. PATENT DOCUMENTS

| | | | |
|---|---|---|---|
| 3,573,379 | 3/1969 | Schmitz | 370/50 |
| 3,864,521 | 2/1975 | DeLong et al. | 370/50 |
| 3,986,020 | 10/1976 | Kogelnik | 455/610 |
| 4,330,869 | 5/1982 | Robieux | 370/3 |
| 4,530,084 | 7/1985 | Strebel et al. | 455/607 |

*Primary Examiner*—Joseph A. Orsino
*Attorney, Agent, or Firm*—Sughrue, Mion, Zinn, Macpeak, and Seas

[57] ABSTRACT

An optical fiber telecommunication device comprises an interconnecting volume and N stations connected to this volume by pairs of transmit and receive optical fibers. Each station comprises a tunable optical frequency laser coupled to the transmit fiber and a heterodyne receiver system coupled to the receive fiber. It is provided with a tunable frequency laser local oscillator. The volume is disposed in a central office comprising a clock to determine different timing periods assigned to the N stations. The carrier frequency of the laser for each station is initially adjusted to a first frequency reserved for modulating ringing signals in the respective channels. The central office comprises a processor connected to the interconnecting volume to receive the ringing signals and designate a carrier frequency for each call request. This frequency is transmitted through the interconnecting volume to the calling station and the called station on a second reserved frequency. This is in order to adjust the frequency of the laser and the frequency of the local oscillator to the designated frequency. The designated frequencies are different for all calls in progress at the same time.

9 Claims, 2 Drawing Figures

OPTICAL FIBER TELECOMMUNICATION DEVICE

BACKGROUND OF THE INVENTION

1. Field of the Invention

The present invention concerns an optical fiber telecommunication device capable of providing communications between N users.

This device is of a type comprising:

N stations assigned respectively to the N users, each station comprising:
- a transmitter circuit adapted to transmit transmit electrical signals,
- a semiconductor laser adapted to deliver a transmit optical wave,
- a modulation circuit connected between the transmitter circuit and the laser to amplitude modulate the transmit optical wave by the transmit electrical signals,
- a photo-electric receiver system adapted to deliver receive electrical signals when it receives a receive optical wave,
- a circuit utilizing the receive electrical signals, and
- a ringing circuit adapted to form electrical signals for ringing other stations, this ringing circuit being connected to the modulation circuit to provide for amplitude modulation of the transmit optical wave by the ringing signals, N pairs of optical fibers respectively connected to the N user stations, each pair comprising a transmit optical fiber of which a first end is optically coupled to the output of the laser and a receive optical fiber of which a first end is coupled to the input of the receiver system, and an interconnection volume filled with a material whose refractive index is similar to that of the material constituting the core of the optical fibers, the second ends of the transmit and receive optical fibers being connected to the surface delimiting this volume.

2. Description of the Prior Art

A telephone device of this type is described in the document FR-A-2.472.889.

In this device optical frequencies $F_1 \ldots F_N$ and modulation frequencies $f_1 \ldots f_n$ are assigned respectively to the N users and the laser of user p delivers a transmit light wave of frequency $F_p$, this light wave being modulated by the modulation frequency $f_n$ assigned to another user n with whom the user p wishes to communicate.

The receiver system of the station of the user p comprises:

N−1 optical filters respectively passing only the frequencies $F_1 \ldots F_{p-1}, F_{p+1} \ldots F_N$, disposed to receive the receive optical wave transmitted by the receive optical fiber, N−1 selective electro-optical sensors receiving the respective outputs of the N−1 optical filters, these sensors delivering an electrical signal only if the amplitude of the luminous energy that they receive is modulated at the frequency $F_n$, means receiving the electrical signals delivered by the selective sensors and adapted to indicate to the user p the rank n of the filter of frequency $F_n$ the output radiation from which has caused the output of an electrical signal from the selective sensor receiving this output radiation, an optical conductor one end of which is disposed on the input surface of a photo-electric receiver, and means for disposing the other end of the optical conductor on the output of the optical filter of frequency $F_n$.

This optical telephone device has the disadvantage of being difficult to employ when the number N of users is high. In this case it is necessary to provide a large number of differing optical frequencies. Also, the receiver system of each user is bulky and difficult to manufacture.

An object of the present invention is to alleviate this disadvantage.

SUMMARY OF THE INVENTION

The present invention consists in an optical fiber telecommunication device adapted to provide communications between N users, of the type comprising:

N stations assigned respectively to the N users, each station comprising:
- a transmitter circuit adapted to transmit transmit electrical signals,
- a semiconductor laser adapted to deliver a transmit optical wave,
- a modulation circuit connected between the transmitter circuit and the laser to amplitude modulate the transmit optical wave by the transmit electrical signals,
- a photo-electric receiver system adapted to deliver receive electrical signals when it receives a receive optical wave,
- a circuit utilizing the receive electrical signals, and
- a ringing circuit adapted to form electrical signals for ringing other stations, this ringing circuit being connected to the modulation circuit to provide for amplitude modulation of the transmit optical wave by the ringing signals, N pairs of optical fibers respectively connected to the N user stations, each pair comprising a transmit optical fiber of which a first end is optically coupled to the output of the laser and a receive optical fiber of which a first end is coupled to the input of the receiver system, and an interconnection volume filled with a material whose refractive index is similar to that of the material constituting the core of the optical fibers, the second ends of the transmit and receive optical fibers being connected to the surface delimiting this volume, in which device:

the semiconductor laser is of the tunable emission frequency type and comprises an element adapted to vary the frequency of the transmit optical wave by variation of an electrical current applied to this element, this current being supplied by a tuning circuit whose output is connected to said element, this current adjusting the frequency of the transmit optical wave to a first carrier frequency $f_1$ when the tuning circuit does not receive any signal, the device comprises an interconnection central office comprising said interconnecting volume, this central office further comprising:
- a timing circuit comprising a clock adapted to send periodic timing signals representative of different timing periods assigned respectively to the N stations,
- means for transmitting these periods to the respective stations, each station comprising means for amplitude modulating the frequency $f_1$ of the transmit optical wave by the ringing signals only within the timing period assigned to each station, and a processor whose input is connected to the interconnection volume in order to receive the ringing signals modulating the frequency $f_1$, these signals originating from the N stations, the processor designating for each call requested an optical frequency $f_p$ available at the time of the call and selected from a predetermined sequence of frequencies, two consecutive frequencies being separated by a constant frequency interval, the output of the processor being connected to the interconnection volume to transmit the information of the designated frequency $f_p$, this transmission being effected on a second optical carrier frequency $f_2$ in the timing periods assigned to the calling and called stations, and the receiver system of each station comprises:

a first photo-electric sensor optically coupled to the first end of the receive optical fiber to receive the signals of frequency $f_2$ transmitted in the timing period reserved to the station, these signals being transmitted to said tuning circuit for adjusting the frequency of the laser to the designated frequency $f_p$, a heterodyne detector system comprising a second photo-electric sensor optically coupled to the first end of the receive optical fiber and a semiconductor local oscillator with a tunable optical emission frequency, the station comprising means for adjusting the frequency of the local oscillator to a frequency $f_q$ near $f_p$, $f_q - f_p$ being small relative to said constant frequency interval between two consecutive frequencies from the predetermined list, the optical wave emitted by the local oscillator illuminating the receive surface of the second sensor and the output of the heterodyne detector system being connected to the user circuit.

In one embodiment of the device in accordance with the invention, the means for amplitude modulating the frequency $f_1$ of the transmit optical wave by the ringing signals only within the timing period assigned to the station comprise:

a memory connected between the ringing circuit and the modulation circuit to store the ringing signals, and a control circuit connected to the memory to pass the stored ringing signals into the modulation circuit only within the timing period assigned to the station.

In this case, the timing circuit may comprise, for each station, a period forming circuit connected to the output of the clock and the means for transmitting these periods to each station may comprise a laser emitting a beam having a third optical carrier frequency $f_3$, an optical fiber connecting the output of this transmitter to a photo-electric receiver disposed in the station, and the electrical output of this receiver being connected to the input of the memory control circuit.

In another embodiment of the device in accordance with the invention the interconnection volume is connected to the input of the processor by a branch comprising a series succession an optical fiber, a bandpass optical filter of frequency $f_1$, a photo-electric receiver and a selector circuit connected to the period forming circuits to separate at the processor input the signals transmitted in the various timing periods.

In another embodiment of the device in accordance with the invention the output of the processor is connected to the interconnecting volume by a branch comprising a series succession a memory and a laser emitting a beam of frequency $f_2$ the output of which is connected to said volume by an optical fiber, this memory being connected to a control circuit connected to the circuits forming the periods assigned to the N stations.

In another embodiment of the device in accordance with the invention, it further comprises, for each station, a bandpass filter of frequency $f_1$ disposed between the first photo-electric sensor and the first end of the receive optical fiber and a selector circuit connected between the output of the first sensor and the input of the tuning circuit in order to adjust the emission frequency of the laser to the designated frequency $f_p$, this selector circuit allowing the receive signals to pass only during the timing period reserved to the station.

In another embodiment of the device in accordance with the invention, for each station, the tuning element of the local oscillator is connected to an output of the tuning circuit and the heterodyne detector system comprises a demodulator circuit connected between the output of the second sensor and the input of the user circuit.

In this case, each station may comprise an alarm circuit connected to the selector circuit disposed in the station.

One embodiment of the present invention will now be described by way of example only and with reference to the appended drawings.

DESCRIPTION OF THE PREFERRED EMBODIMENT

Figure 1:
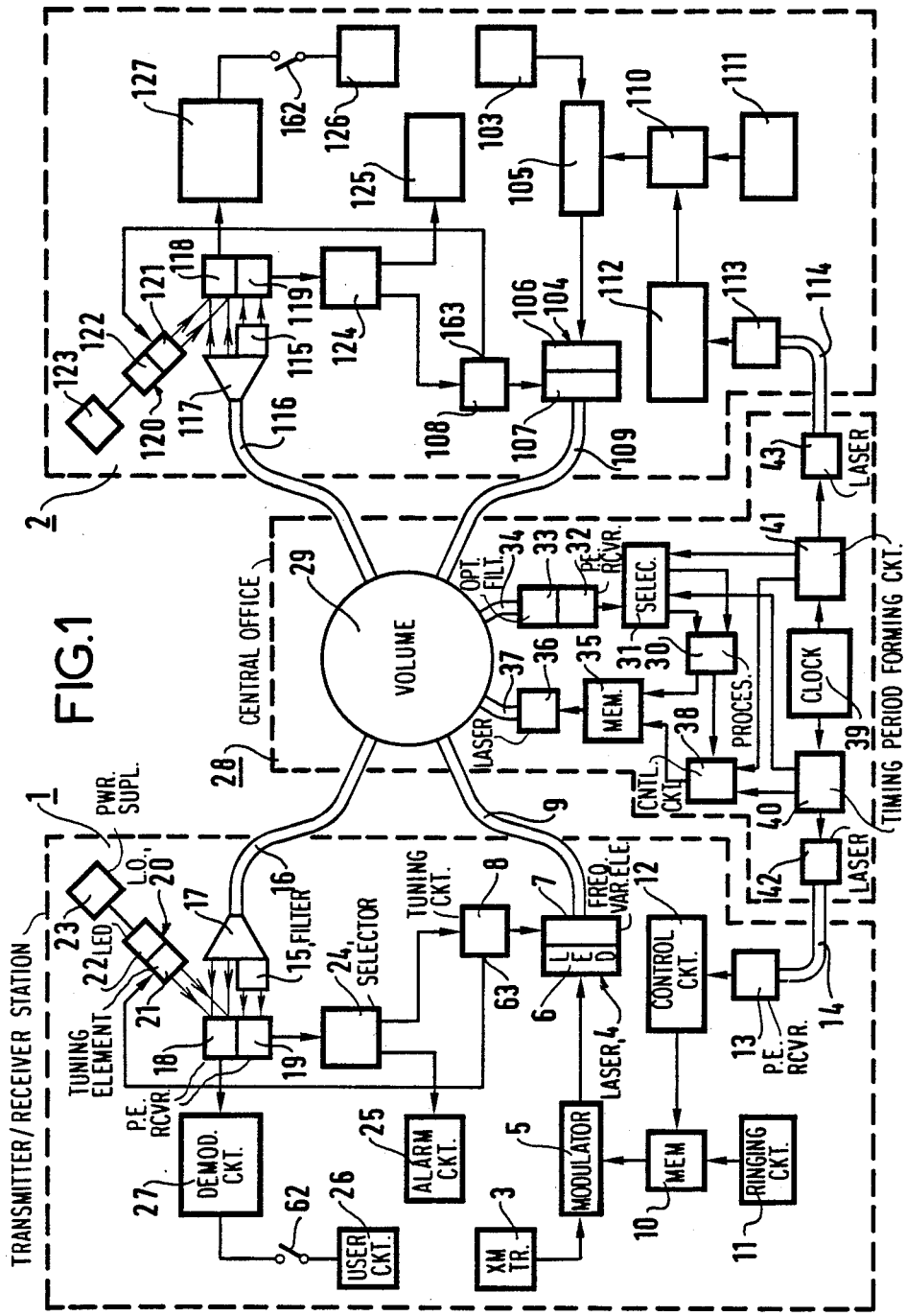
FIG. 1 is a schematic representation of one embodiment of the device in accordance with the invention.

FIG. 1 shows an optical telecommunication device adapted to provide communications between N users, where the value of N may be in the order of 100,000, these users being, for example, the telephone subscribers of an entire French d,acu/e/ partement (administrative area). Each user has a transmitter-receiver station; to simplify the diagram only two stations 1 and 2 have been shown.

The station 1 comprises a transmitter circuit 3 adapted to transmit transmit electrical signals which may be telephone or video signals. The circuit 3 is connected to the electrical input of a semiconductor laser 4 through a modulator circuit 5.

The laser 4 is of the type in which the radiated frequency can be tuned, as described in the article "High-speed direct single-frequency modulation with large tuning rate and frequency excursion in cleaved-coupled-cavity semiconductor lasers" (W. T. Tsang et al) from the American journal "Applied Physics Letters" volume 42, No. 8, Apr. 15, 1983, pages 650 through 652. The laser 4 comprises a light-emitting diode 6 and an element 7 adapted to vary the frequency of the optical wave emitted by the diode 6, the diode 6 and the element 7 being optically coupled. The frequency is varied by varying an electrical current 5 applied to the element 7. A tuning circuit 8 is connected to the element 7 of the laser 4. The output of the laser 4 is optically coupled to one end of a transmit optical fiber 9.

The modulator circuit 5 is connected through a memory 10 to a ringing circuit 11. A control circuit 12 is connected to the memory 10 and to the electrical output of photo-electric receiver 13 whose optical input is coupled to one end of another optical fiber 14.

The station 1 further comprises a photo-electric receiver system which includes an optical filter 15 disposed to receive some of the optical radiation leaving one end of a receive optical fiber 16 through an optical coupling member 17. The remainder of this radiation illuminates the receive surface of a photo-electric receiver 18. The radiation passing through the filter 15 reaches the receive circuit of another photo-electric receiver 19. A local oscillator 20 comprising a semiconductor laser with tunable emission frequency, of a similar type to the laser 4, is disposed so that its output radiation illuminates the receive surface of the receiver 18. The tuning element 21 of the oscillator 20 is electrically connected to the output 63 of the tuning circuit 8 while the light-emitting diode 22 of the oscillator 20 is connected to a power supply circuit 23. The electrical output of the receiver 19 is connected to the input of a selector circuit 24 whose output is connected to the tuning circuit 8 and to an alarm circuit 25, which may consist of an electric bell.

The electrical output of the receiver 18 is connected to a user circuit 26 through a demodulator circuit 27 and a switch 62. In the case where the device in accordance with the invention is applied to a telephone system, for example, the transmitter circuit 3 may be the microphone of a handset and the user circuit 26 may be the earpiece of the handset.

The station 2 is strictly identical to the station 1 and the components of the station 2 corresponding to components 3 through 27, 62 and 63 of the station 1 have been respectively designated by the reference numerals 103 through 127, 162 and 163.

The device shown in FIG. 1 comprises an interconnecting central office 28. This central office comprises an interconnecting volume 29. This volume may be a sphere, for example and as shown here. It may be formed by an envelope containing diffusive elements filled with a material having a refractive index similar to that of the optical fiber cores. This material may be air, for example. The free ends of the transmit and receive optical fibers such as fibers 9 and 16 belonging to the various user stations are connected, as by welding, for example, to the envelope delimiting the volume 29.

The interconnecting central office 28 further comprises a processor 30 having N inputs respectively connected to the N outputs of a selector circuit 31. The input of the circuit 31 is connected to the electrical output of a photo-electric receiver 32 whose optical input is coupled to an optical filter 33 itself connected to the volume 29 by a section 34 of optical fiber. The output of the processor 30 is connected to the input of the memory 35 whose output is connected to the electrical input of a semiconductor laser 36. The optical output of the laser 36 is connected to the volume 29 by a section 37 of optical fiber. A control circuit 38 is connected to the memory 35 and to the output of the processor 30.

The interconnecting central office 28 further comprises a clock 39 and N timing period forming circuits such as the circuits 40 and 41 connected to the output of this clock. The N outputs of the selector circuit 31 are respectively connected to the N period forming circuits. The control circuit 38 has N inputs respectively connected to the N period forming circuits. The output of the circuit 40 is connected to the electrical input of a semiconductor laser 42 the optical output of which is coupled to the free end of the optical fiber 14. Likewise, the output of the circuit 41 is connected to the electrical input of a semiconductor laser 43 the optical output of which is coupled to the free end of the optical fiber 114.

The device shown in FIG. 1 functions in the following manner.

Figure 2:
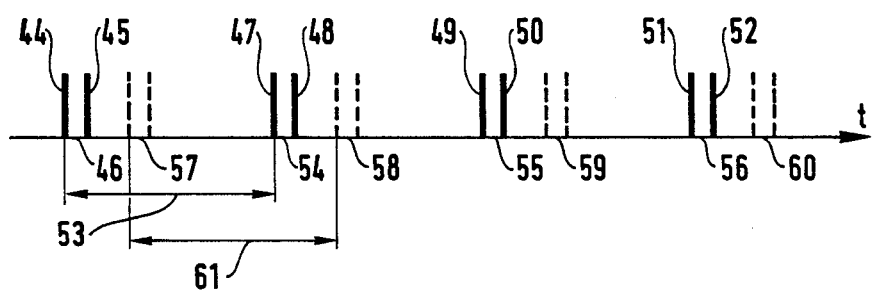
FIG. 2 is a diagram showing the timing periods assigned to the various stations.

The circuits such as circuits 40 and 41 form periodic timing periods for the N stations. Each station is assigned a series of periods distinct from those assigned to the other stations. FIG. 2 is a diagram showing a group of two consecutive pulses 44 and 45 delimiting a timing period 46 consisting of the time interval between the pulses 44 and 45. These pulses are produced by the circuit 40 on the basis of the pulses from the clock 39. The circuit 40 also delivers pairs of pulses 47–48, 49–50, 51–52, etc analogous to the group 44–45 at equal time intervals 53 so as to form, together with the period 46, a periodic series of timing periods 55, 55, 56 assigned to the station 1.

Similarly, the circuit 41 delivers groups of pulses shown in dashed line in FIG. 2 and delimiting a series of timing periods 57, 58, 59, 60, separated by a time interval 61 equal to the interval 53. This series of periods is assigned to the station 2.

The series of periods assigned to the various stations are, of course, offset relative to each other so as to be distinct from each other. To give an example, each timing period has a duration of a few microseconds whereas the time intervals 53 and 61 are equal to one second.

The timing periods are transmitted by an optical fiber to the station to which they are assigned. Thus the periods assigned to the station 1 and delivered by the circuit 40 modulate the amplitude of an optical wave of frequency $f_3$ emitted by the semiconductor laser 42, this optical wave being transmitted by the optical fiber 14 to the photo-electric receiver 13 in the station 1. The frequency $f_3$ is reserved exclusively for transmitting these periods to the various stations: the periods assigned to the station 2 modulate the optical frequency $f_3$ of the optical wave emitted by the semiconductor laser 43 and transmitted by the optical fiber 114 to the photo-electric receiver 113 in the station 2.

Each station is assigned a number. When the user of station 1 wishes to communicate with the user of station 2 he enters the number of station 2 into the ringing circuit 11. This ringing circuit may be of the well-known rotary dial type as used in telephone installations, for example. The electrical pulses characterizing the number of station 2 output by the circuit 11 are stored in the memory 10. Control circuit 12 makes it possible to transfer these ringing pulses from the memory 10 into the modulation circuit 5 only during the timing periods of the sequence of periods assigned to the station 1, the information of these periods being delivered to the input of the circuit 12 by the electrical output of the photo-electric receiver 13. The circuit 5 amplitude modulates the optical wave emitted by the laser 4 with the ringing signals. When the tuning circuit 8 does not receive any signal on its input the frequency of the optical wave emitted by the laser 4 is equal to a frequency $f_1$ reserved for calls originating from the various stations.

The ringing signals from the station 2 modulating the frequency $f_1$ of the wave emitted by the laser 4 within the series of timing periods assigned to the station 1 are therefore received in the volume 29 which also receives, at the same time, other ringing signals emanating from other stations, these signals all modulating the same frequency $f_1$ but being sent in different timing periods.

All these ringing signals are transmitted by the fiber 34 and pass through the optical filter 33, which is a bandpass filter of frequency $f_1$, to be received on the receive surface of the photo-electric receiver 32. The signals delivered by the electrical output of the receiver 32 are received at the input of the selector circuit 31. This directs to its N outputs the signals sent in the respective N series of timing periods assigned to the N stations. The processor 30 processes the simultaneous calls in a predetermined order and designates for each call a different optical carrier frequency. The optical frequencies are, for example, arranged in a predetermined list $f_1 \ldots f_M$ and the processor 31, which is aware of all calls in progress, designates the lowest rank available frequency. Immediately it receives the ringing signals from the station 1 to enter into communication with the station 2, it designates the optical carrier frequency $f_p$, for example.

If the number of users is $N=100,000$, the maximum number of simultaneous calls may be estimated at around $M=10,000$. To give an example, a constant interval of $10^8$ Hz may be allowed between consecutive frequencies from the predetermined list.

Electrical signals presenting the frequency $f_p$ designated for the call between the stations 1 and 2 are delivered at the output of the processor 30 and stored in the memory 35. The control circuit 38 connected to the various period forming circuits 40 and 41 is informed by the processor 30 that a call has to be set up between the station 1 and the station 2; it enables the signals stored in the memory 35 to pass only within the series of periods assigned to the calling and called stations, from the memory 35 to a semiconductor laser 36 emitting an optical wave of fixed frequency $f_2$. This optical wave modulated by these signals is transmitted through the fiber 37 to the interconnecting volume 29.

The optical waves of frequency $f_2$ present in the volume 29 are transmitted by the receive optical fiber 116 of the station 2 and pass through the optical filter 115 which is of the bandpass type with frequency $f_2$. The receiver 119 delivers at its output the electrical signals modulating these waves and the selector circuit 124 retains of these signals only those situated within the series of periods reserved to the station 2. The alarm circuit 125 is then activated, to alert the station 2 user that the user of another station wishes to communicate with him.

The tuning circuit 108 receives on its inputs signals representing the frequency $f_p$ designated for this call. The circuit 108 comprises means for applying to the element 107 of the laser 104 an electrical current adapted to adjust the frequency of the optical wave emitted by the laser 104 to the designated frequency $f_p$.

The user of the station 2 can then instigate transmission by the circuit 103 of signals representing a message to be transmitted to the user of the station 1. The modulator circuit 105 modulates the optical wave of frequency $f_p$ emitted by the laser 104 with the message signals. The optical signals emitted by the laser 104 are transmitted by the fiber 109 to the interconnecting volume 29.

The optical waves of frequency $f_2$ present in the volume 29 are also transmitted by the optical fiber 16 and pass through the optical filter 15 which is also a bandpass filter of frequency $f_2$, however, the receiver 19 delivers at its output the electrical signals modulating these waves and the selector circuit 24 retains of these signals only those situated within the series of periods reserved to the station 1. These latter signals are transmitted to the tuning circuit 8 which applies to the element 7 of the laser 4 a current for automatically adjusting the emission frequency of this laser to the designated frequency $f_p$. The station 1 user can thus instigate transmission by the circuit 3 of electrical signals corresponding to a message to be sent to the station 2 user. This message is sent after modulation by the circuit 5 of the optical wave emitted by the laser 4 in the form of signals modulating the optical wave of frequency $f_p$ emitted by the laser 4 and transmitted by the fiber 9 to the interconnecting volume 29.

The tuning circuit 8 comprises means for delivering, on its output 63 connected to the element 21 of the local oscillator 20, signals adapted to adjust the emission frequency of this oscillator to a frequency $f_q$ which is very close $f_p$. The difference $f_q - f_p$ must be small relative to the interval between two consecutive frequencies from the predetermined list of carrier frequencies. The receiver 18 then operates as a heterodyne reception system and delivers at its output an electric wave of frequency $f_q - f_p$. This wave is modulated by the signals emitted by the circuit 103 which modulate the wave of frequency $f_p$ emitted by the laser 104 arriving in the volume 29. This heterodyne reception system makes it possible to eliminate the other optical waves passing into the volume 29 whose carrier frequencies, differing from $f_p$, are designated by the processor 30 for other calls set up at the same time as the call between the stations 1 and 2.

The electric wave of frequency $f_q - f_p$ delivered by the receiver 18 is demodulated by the demodulator circuit 27 and the user circuit 26 thus receives the electrical signals emitted by the circuit 103 by the station 2 user and addressed to the station 1 user.

Likewise the signals delivered at the output 163 of the tuning circuit 108 are transmitted to the element 121 of the local oscillator 120 so as to adjust its emission frequency to the value $f_q$. The receiver 118 then functions as a heterodyne reception system and delivers at its output an electric wave of frequency $f_q - f_p$ demodulated by the circuit 127. The user circuit 126 of the station 2 thus receives the message from the station 1 emitted by the circuit 3.

The call is thus set up in both directions between the stations 1 and 2.

Means for attenuating or blocking the receive signals operative during functioning of the transmit circuit may be provided in the receive circuit of each station to avoid the message sent by a station being received on the user circuit of the same station. These means are schematically represented by the switches 62 and 162.

The telecommunication device in accordance with the invention has the advantage of using only a minimum number of carrier frequencies ($f_p$), this number being equal to the maximum number of calls that can be set up simultaneously between the N stations of the installation. This number is very much less than N. The number of frequencies ($f_1$, $f_2$, $f_3$) reserved for transmission of ancillary signals is very small.

Moreover, the reception system of each station is simplified through the use of a heterodyne system which provides for effective filtering of the carrier frequencies of waves present simultaneously in the interconnecting volume. The manufacture of the stations is also simplified by using semiconductor lasers with tunable emission frequencies.

The fixed emission frequency semiconductor lasers (such as 36, 42 and 43) may be lasers with the emission frequency adjustable during manufacture, of the type described in the article "Room temperature CW operation of distributed-feedback buried-hetero structure In Ga As P/I$_n$ P lasers emitting at 1.57 micron" (K. UTAKA et al), published in the American journal "Electronics Letters", Dec. 10, 1981, volume 17, No 25, pages 961 through 963.

The device in accordance with the invention may be applied to the implementation of a telecommunication network comprising 100,000 users connected to a central office.

There is claimed:

1. Optical fiber telecommunication device adapted to provide communications between N users, comprising:
   N stations assigned respectively to the N users, each station comprising:
   a transmitter circuit adapted to transmit transmit electrical signals,
   a semiconductor laser adapted to deliver a transmit optical wave,
   a modulation circuit connected between the transmitter circuit and the laser to amplitude modulate the transmit optical wave by the transmit electrical signals,
   a photo-electric receiver system adapted to deliver receive electrical signals when it receives a receive optical wave,
   a circuit utilizing the receive electrical signals, and
   a ringing circuit adapted to form electrical signals or ringing other stations, this ringing circuit being connected to the modulation circuit to provide for amplitude modulation of the transmit optical wave by the ringing signals,
   N pairs of optical fibers respectively connected to the N user stations, each pair comprising a transmit optical fiber of which a first end is optically coupled to the output of the laser and a receive optical fiber of which a first end is coupled to the input of the receiver system, and
   an interconnection volume filled with a material whose refractive index is similar to that of the material constituting the core of the optical fibers being connected to the surface delimiting this volume, in which device:
   the semiconductor laser is of the tunable emission frequency type and comprises an element adapted to vary the frequency of the transmit optical wave by variation of an electrical current applied to this element, this current being supplied by a tuning circuit whose output is connected to said element, this current adjusting the frequency of the transmit optical wave to a first carrier frequency $f_1$ when the tuning circuit does not receive any signal,
   the device comprises an interconnection central office comprising said interconnection volume, this central office further comprising:
   a timing circuit comprising a clock adapted to send periodic timing signals representative of different timing periods assigned respectively to the N stations,
   a means for transmitting signals indicative of these periods to the respective stations, each station comprising means for amplitude modulating the frequency $f_1$ of the transmit optical wave by the ringing signals only within the timing period assigned to each station, and
   a processor whose input is connected to the interconnection volume in order to receive the ringing signals modulating the frequency $f_1$, these signals originating from the N stations, the processor designating for each call requested an optical frequency $f_p$ available at the time of the call and selected from a predetermined sequence of frequencies, two consecutive frequencies being separated by a constant frequency interval, the output of the processor being connected to the interconnection volume to transmit the information of the designated frequency $f_p$, transmission being effected on a second optical carrier frequency $f_2$ in the timing periods assigned to the calling and called stations, and
   the receiver system of each station comprises:
   a first photo-electric sensor optically coupled to the first end of the receive optical fiber to receive the signals of frequency $f_2$ transmitted in the timing period reserved to the station, these signals being transmitted to said tuning circuit for adjusting the frequency of the laser to the designated frequency $f_p$,
   a heterodyne detector system comprising a second photo-electric sensor optically coupled to the first end of the receive optical fiber and a semiconductor local oscillator with a tunable emission optical frequency, the station comprising means for adjusting the frequency of the local oscillator to a frequency $f_q$ near $f_p$, $f_q - f_p$ being small relative to said constant frequency interval between two consecutive frequencies from the predetermined list, the optical wave transmitted by the local oscillator illuminating the receive surface of the second sensor and the output of the heterodyne detector system being connected to a user circuit.

2. Device according to claim 1, wherein the means for amplitude modulating the frequency $f_1$ of the transmit optical wave by the ringing signals only within the timing period assigned to the station comprise:
   a memory connected between the ringing circuit and the modulation circuit to store the ringing signals, and
   a control circuit connected to the memory to pass the stored ringing signals into the modulation circuit only within the timing period assigned to the station.

3. Device according to claim 2, wherein the timing circuit comprises, for each station, a period forming circuit connected to the output of the clock and the means for transmitting signals representing these periods to each station comprise a laser emitting a beam having a third optical carrier frequency $f_3$, an optical fiber connecting the output of the transmitting means to a photo-electric receiver disposed in the station, and the electrical output of this receiver being connected to the input of the memory control circuit.

4. Device according to claim 1, wherein the interconnection volume is connected to the input of the processor by a branch comprising in series succession an optical fiber, a bandpass optical filter of frequency $f_1$, a photo-electric receiver and a selector circuit connected to the period forming circuits to separate at the processor input the signals transmitted in the various timing periods.

5. Device according to claim 1, wherein the output of the processor is connected to the interconnecting volume by a branch comprising in series succession a memory and a laser emitting a beam of frequency $f_2$ the output of which is connected to said volume by an optical fiber, this memory being connected to a control circuit connected to the circuits forming the periods assigned to the N stations.

6. Device according to claim 1, further comprising, for each station, a bandpass filter of frequency $f_1$ disposed between the first photo-electric sensor and the first end of the receive optical fiber and a selector circuit connected between the output of the first sensor and the input of the tuning circuit in order to adjust the emission frequency of the laser to the designated frequency $f_p$, this selector circuit allowing the receive signals to pass only during the timing period reserved to the station.

7. Device according to claim 1, wherein, for each station, a tuning element of the local oscillator is connected to an output of the tuning circuit and the heterodyne detector system comprises a demodulator circuit connected between the output of the second sensor and the input of the user circuit.

8. Device according to claim 6, wherein each station comprises an alarm circuit connected to the selector circuit disposed in the station.

9. Device according to claim 1, wherein each station further comprises means for attenuating the receive electrical signals, said attenuating means being operative when said transmit circuit is transmitting said transmit electrical signals.

* * * * *